United States Patent
Zhang et al.

(10) Patent No.: US 12,003,592 B2
(45) Date of Patent: Jun. 4, 2024

(54) METHOD AND APPARATUS FOR SERVICE DISCOVERY

(71) Applicant: Telefonaktiebolaget LM Ericsson (publ), Stockholm (SE)

(72) Inventors: Xiaowei Zhang, Shanghai (CN); Peng Li, Shanghai (CN); Cheng Wang, Shanghai (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 350 days.

(21) Appl. No.: 17/600,150

(22) PCT Filed: Apr. 2, 2020

(86) PCT No.: PCT/CN2020/082929
§ 371 (c)(1),
(2) Date: Sep. 30, 2021

(87) PCT Pub. No.: WO2020/200268
PCT Pub. Date: Oct. 8, 2020

(65) Prior Publication Data
US 2022/0124162 A1  Apr. 21, 2022

(30) Foreign Application Priority Data
Apr. 2, 2019 (WO) ................ PCT/CN2019/081035

(51) Int. Cl.
*H04L 67/51* (2022.01)
*H04W 4/50* (2018.01)
(Continued)

(52) U.S. Cl.
CPC ............... *H04L 67/51* (2022.05); *H04W 4/50* (2018.02); *H04W 24/02* (2013.01); *H04W 48/16* (2013.01)

(58) Field of Classification Search
CPC ........ H04L 67/51; H04W 4/50; H04W 24/02; H04W 48/16
See application file for complete search history.

(56) References Cited

U.S. PATENT DOCUMENTS 10,715,482 B2 *  7/2020  Rahman ................. H04L 67/51
11,811,625 B2 * 11/2023  Lair ....................... H04L 67/52
(Continued)

FOREIGN PATENT DOCUMENTS

| CN | 109495929 A | 3/2019 |
|---|---|---|
| WO | 2018171316 A1 | 9/2018 |
| WO | 2019034268 A1 | 2/2019 |

OTHER PUBLICATIONS

International Search Report and the Written Opinion of the International Searching Authority, issued in corresponding International Application No. PCT/CN2020/082929, dated Jul. 8, 2020, 9 pages.
(Continued)

*Primary Examiner* — Kenneth T Lam
(74) *Attorney, Agent, or Firm* — Weisberg I.P. Law, P.A.

(57) ABSTRACT

Embodiments of the present disclosure provide methods and apparatuses for service discovery. The method may comprise sending a first service discovery request including forward information indicating that the first service discovery request has been processed by one or more network function repository nodes to a second network function repository node; and receiving a first service discovery response from the second network function repository node.

18 Claims, 9 Drawing Sheets

---

200

202
Sending a first service discovery request including forward information indicating that the first service discovery request has been processed by one or more network function repository nodes to a second network function repository node 204
Receiving a first service discovery response from the second network function repository node

(51) Int. Cl.
*H04W 24/02* (2009.01)
*H04W 48/16* (2009.01)

(56) References Cited

U.S. PATENT DOCUMENTS

| | | | | |
|---|---|---|---|---|
| 2014/0078935 | A1* | 3/2014 | Sun | H04W 8/005 370/254 |
| 2015/0341448 | A1 | 11/2015 | Li et al. | |
| 2018/0227871 | A1* | 8/2018 | Singh | H04W 48/18 |
| 2019/0273650 | A1* | 9/2019 | Ma | H04L 41/5058 |
| 2021/0007160 | A1* | 1/2021 | Sivasiva Ganesan | H04W 28/0268 |
| 2021/0234934 | A1* | 7/2021 | Xia | H04L 67/61 |
| 2021/0235260 | A1* | 7/2021 | Zhang | H04W 48/16 |
| 2021/0282003 | A1* | 9/2021 | Li | H04W 8/28 |
| 2022/0030413 | A1* | 1/2022 | Ben Henda | H04W 8/02 |

OTHER PUBLICATIONS

China Mobile "Hierarchical NF discovery in recursion mode", 3GPP TSG CT WG4 Meeting #86, C4-186581,Aug. 24, 2018 (Aug. 24, 2018), 2 pages.

China Mobile "Hierarchical NF discovery in recursion mode", 3GPP TSG CT WG4 Meeting #86, C4-186468,Aug. 24, 2018 (Aug. 24, 2018), 3 pages.

Nokia et al. "Features of NF Discovery service", 3GPP TSG-CT WG4 Meeting #89, C4-190159,Mar. 1, 2019 (Mar. 1, 2019), 8 pages.

3GPP "3rd Generation Partnership Project; Technical Specification Group Services and System Aspects; System Architecture for the 5G System; Stage 2 (Release 15)" 3GPP TS 23.501 V15.3.0 (Sep. 2018), 226 pages.

3GPP "3rd Generation Partnership Project; Technical Specification Group Services and System Aspects; Procedures for the 5G System; Stage 2 (Release 15)" 3GPP TS 23.502 V15.3.0 (Sep. 20189), 330 pages.

3GPP "3rd Generation Partnership Project; Technical Specification Group Core Network and Terminals; 5G System; Network Function Repository Services; Stage 3 (Release 15)" 3GPP TS 29.510 V15. 1.0 (Sep. 2018), 84 pages.

EPO Communication with Supplementary European Search Report dated Apr. 22, 2022 for Patent Application No. 20785094.2, consisting of 7-pages.

* cited by examiner

200

202
Sending a first service discovery request including forward information indicating that the first service discovery request has been processed by one or more network function repository nodes to a second network function repository node 204
Receiving a first service discovery response from the second network function repository node

METHOD AND APPARATUS FOR SERVICE DISCOVERY

CROSS REFERENCE TO RELATED APPLICATION(S)

This application is a 35 U.S.C. § 371 National Phase Entry Application from PCT/CN2020/082929, filed Apr. 2, 2020, designating the United States, and also claims the benefit of International Application No. PCT/CN2019/081035, filed Apr. 2, 2019, the disclosures of which are incorporated herein by reference in their entirety.

TECHNICAL FIELD

The non-limiting and exemplary embodiments of the present disclosure generally relate to the technical field of communications, and specifically to methods and apparatuses for service discovery.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for fifth generation (5G) network such as new radio (NR) has been proposed. FIG. 1 is a diagram illustrating an exemplary 5G system architecture, which is a copy of FIG. 4.2.3-1 of 3 rd Generation Partnership Project (3GPP) TS 23.501 and the disclosure of 3GPP TS 23.501 V15.4.0 is incorporated by reference herein in its entirety. As shown in FIG. 1, 5G system architecture may comprise a plurality of network functions (NFs) such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF),Unified Data Management (UDM), User Plane Function (UPF), Application Function (AF), User Equipment (UE), (Radio) Access Network ((R)AN), etc.

NRF may support NF service registration and NF service discovery. For the NRF to properly maintain information of available NF instances and their supported services, each NF instance informs the NRF of a list of NF services that it supports and other NF instance information during the NF service registration. Each NF instance may have a NF profile. The NF profile may include NF instance identifier (ID), NF type, Public Land Mobile Network (PLMN) ID, network slice related identifier(s), Fully Qualified Domain Name (FQDN) or Internet protocol (IP) address of NF, NF capacity information, names of supported services, endpoint information of instance(s) of each supported service, etc.

The NF registration service enables a NF service provider to registration its NF profile such as supported NF service(s) and other NF instance information in NRF and make it available to be discovered by other NF(s). The NF discovery service enables a NF service consumer to discover the service(s) provided by the NF service provider by querying the NRF. Depending on a requesting NF and a target NF, different input parameters may be included in the NF discovery request which may enable NRF to find and match the target NF that has registered in NRF which best serves the requesting NF.

Unless next hop NF information is available in a NF, the NF shall make use of NRF to find out the information such as location and capability of the next hop NF and related service(s) that the NF intends to use.

Multiple NRFs may be deployed in the 5G network. For example, in the context of Network Slicing, based on network implementation, multiple NRFs can be deployed at different levels:
  Public Land Mobile Network (PLMN) level (the NRF is configured with information for the whole PLMN),
  shared-slice level (the NRF is configured with information belonging to a set of Network Slices),
  slice-specific level (the NRF is configured with information belonging to an S-NSSAI (Single Network Slice Selection Assistance Information)).

In the context of roaming, multiple NRFs may be deployed in the different networks:
  the NRF(s) in the Visited PLMN (known as the vNRF) configured with information for the visited PLMN.
  the NRF(s) in the Home PLMN (known as the hNRF) configured with information for the home PLMN, referenced by the vNRF via the N27 interface, In the context of a big mobile network operator (MNO) network, MNO may normally dimension their big network to small subnetworks, e.g. based on geography area, for better management, for its own operation efficiency or for new business model build-up, it is also possible to forward or redirect service discovery via multiple NRFs before a final result is retrieved Subclauses 5.3.2.2.4 and 5.3.2.2.5 of 3GPP TS 29.510 V15.2.0 have defined two methods to support service discovery via intermediate NRFs, the disclosure of which is incorporated by reference herein in its entirety. As described in subclause 5.3.2.2.4 of 3GPP TS 29.510 V15.2.0, when multiple NRFs are deployed in one PLMN, one NRF may query the "nf-instances" resource in a different NRF so as to fulfill the service discovery request from a NF service consumer. The query between these two NRFs is redirected by a third NRF. As described in subclause 5.3.2.2.5 of 3GPP TS 29.510 V15.2.0, when multiple NRFs are deployed in one PLMN, one NRF may query the "nf-instances" resource in a different NRF so as to fulfill the service discovery request from a NF service consumer. The query between these two NRFs is forwarded by a third NRF.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As described above, when the service discovery is implemented by using intermediate NRFs, the service discovery request could traverse intermediate NRFs to get the result. For example, in case of cross region service discovery, a regional NRF which can't locate a NF profile in its own region may forward the service discovery request to a PLMN level NRF to find the NF profile in other regions. For example, based on the specific implementation, the PLMN level NRF may further multicast the service discovery request towards other region NRF(s) or forwards the service discovery request to a dedicated NRF or instruct the source NRF with redirect to another NRF. In addition, for those next hop NRFs receiving a relayed service discovery request from upstream e.g. from PLMN level NRF, they may further determine whether the target NF profile can be located in their own regions. If not, they may further relay to the service discovery request to a next hop NRF.

However, in such case when an NRF triggers the service discovery request towards another next hop NRF, it is not clear how the requester NRF can get the knowledge of whether the intended next hop NRF has already been visited to serve the service discovery request. If it is and the requester NRF still send out the service discovery request towards that intended NRF, e.g. to the PLMN level NRF, it could cause a potential loop of the service discovery request. As a first example, when the service discovery is implemented by using intermediate NRFs, a region NRF A may send the service discovery request to the PLMN level NRF; the PLMN level NRF identifies the next hop region NRF B and forwards the service discovery request to region NRF B; in case region NRF B cannot find the result within its own region, it may trigger the service discovery request to be forwarded to the PLMN level NRF again; and the PLMN level NRF may send the service discovery request back to NRF A. As a second example, when the service discovery is implemented by using intermediate NRFs, NRF A may send the service discovery request to NRF B; NRF B cannot find the result within its own region, it may trigger the service discovery request to be redirected to NRF C; NRF A may send the service discovery request to NRF C; and NRF C cannot find the result within its own region, it may trigger the service discovery request to be redirected to NRF B. Therefore there may be a potential loop of the service discovery request. Even though Hyper Text Transfer Protocol (HTTP) protocol support optional header "forwarded" to record the intermediate node that a HTTP request transverses, this header is however easily/commonly manipulated/removed by HTTP proxy.

To overcome or mitigate the above mentioned problem or other problems or provide a useful solution, the embodiments of the present disclosure propose an improved service discovery solution which can prevent a potential service discovery request loop. In some embodiments of the present disclosure, a visited network function repository (such as NRF) list parameter may be added into network function repository node (such as NRF) API (Application Program Interface), i.e., the service discovery request may include the visited network function repository node (such as NRF) list parameter. Thus when a network function repository node such as NRF receives the service discovery request including the visited network function repository node list parameter and decides to relay or redirect this service discovery request to another network function repository node, it may check the visited network function repository node list first and exclude any network function repository node from the visited network function repository node list to be an candidate for the next hop network function repository node. In some embodiments of the present disclosure, a visited network function repository node hop parameter is added into network function repository node API, i.e., the service discovery request may include the visited network function repository node hop parameter. Thus when a network function repository node receives a service discovery request including the visited network function repository node hop parameter and decides to relay or redirect this service discovery request to another network function repository node, it shall check the visited network function repository node hop parameter first and make sure that the service discovery request shall not be relayed or redirect more times than a pre-defined maximum number of hops, thereby avoiding the service discovery request being forwarded or redirected too many times.

In a first aspect of the disclosure, there is provided a method at a first network function repository node. The method comprises sending a first service discovery request including forward information indicating that the first service discovery request has been processed by one or more network function repository nodes to a second network function repository node; and receiving a first service discovery response from the second network function repository node.

In an embodiment, the forward information may include a forward indicator indicating that the first service discovery request has been forwarded before and/or a visited network function repository node list and/or a number of network function repository nodes that have been visited to serve the first service discovery request.

In an embodiment, the forward information may further include a maximum number of network function repository nodes that can be visited to serve the first service discovery request.

In an embodiment, the visited network function repository node list may include information of the first network function repository node.

In an embodiment, sending the first service discovery request may be in response to the first network function repository node receives a second service discovery request.

In an embodiment, the first service discovery request may be generated based on the second service discovery request.

In an embodiment, the first service discovery response may include information of a next hop network function repository node and updated forward information, the method according to the first aspect of the disclosure may further comprise sending another first service discovery request including the updated forward information to the next hop network function repository node; and receiving another first service discovery response from the next hop network function repository node.

In an embodiment, the first service discovery response may include information of a next hop network function repository node, the method according to the first aspect of the disclosure may further comprise determining that the first service discovery request is not processed by the next hop network function repository node based on the forward information; sending another first service discovery request including updated forward information to the next hop network function repository node; and receiving another first service discovery response from the next hop network function repository node.

In an embodiment, a network function repository node may be identified with at least one of a network function instance identifier, a network function fully qualified domain name(FQDN), an Internet protocol (IP) address, a universal resource identifier(URI), a uniform resource location(URL), data center information, geography location information, network topology information, network identity information, a sub-network type, subscriber information, network slice information, dedicated core network information, and a designated flag assigned by a network operator.

In a second aspect of the disclosure, there is provided a method at a second network function repository node. The method comprises receiving a first service discovery request including forward information indicating that the first service discovery request has been processed by one or more network function repository nodes from a first network function repository node; and sending a first service discovery response to the first network function repository node.

In an embodiment, the method according to the second aspect of the disclosure further comprises updating the forward information; determining a next hop network function repository node that has not been visited to serve the first service discovery request based on the forward information, wherein the first service discovery response includes information of the next hop network function repository and/or the updated forward information.

In an embodiment, when the forward information includes a number of network function repository nodes that have been visited to serve the first service discovery request, the method according to the second aspect of the disclosure may further comprise deciding whether to determine the next hop network function repository node that has not been visited to serve the first service discovery request based on an updated number of network function repository nodes and a maximum number of network function repository nodes that can be visited to serve the first service discovery request.

In an embodiment, the method according to the second aspect of the disclosure further comprises determining a next hop network function repository node that has not been visited to serve the first service discovery request; sending an updated first service discovery request including the updated forward information to the next hop network function repository node; and receiving a corresponding service discovery response from the next hop network function repository node.

In an embodiment, when the forward information includes a number of network function repository nodes that have been visited to serve the first service discovery request and a maximum number of network function repository nodes that can be visited to serve the first service discovery request, the method according to the second aspect of the disclosure further comprises deciding whether to determine the next hop network function repository node that has not been visited to serve the first service discovery request based on the updated number of network function repository nodes and the maximum number of network function repository nodes.

In a third aspect of the disclosure, there is provided an apparatus implemented at a first network function repository node. The apparatus may comprise a processor; and a memory coupled to the processor, said memory containing instructions executable by said processor, whereby said apparatus is operative to send a first service discovery request including forward information indicating that the first service discovery request has been processed by one or more network function repository nodes to a second network function repository node; and receive a first service discovery response from the second network function repository node.

In a fourth aspect of the disclosure, there is provided an apparatus implemented at a second network function repository node. The apparatus may comprise a processor; and a memory coupled to the processor, said memory containing instructions executable by said processor, whereby said apparatus is operative to receive a first service discovery request including forward information indicating that the first service discovery request has been processed by one or more network function repository nodes from a first network function repository node; and send a first service discovery response to the first network function repository node.

In a fifth aspect of the disclosure, there is provided a computer program product, comprising instructions which, when executed on at least one processor, cause the at least one processor to carry out the method according to the first aspect of the disclosure.

In an sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

Many advantages may be achieved by applying the proposed solution according to embodiments of the present disclosure. For example, some embodiments of the present disclosure may enable 5G core network (5GC) NF to do service discovery cross region and prevent a potential service request loop. Some embodiments of the present disclosure may avoid a service request being forwarded or redirected among intermediate NRFs too many times. Some embodiments of the present disclosure can make sure that a potential discovery request loop is detected properly by the network function repository node.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figures 1, 2:
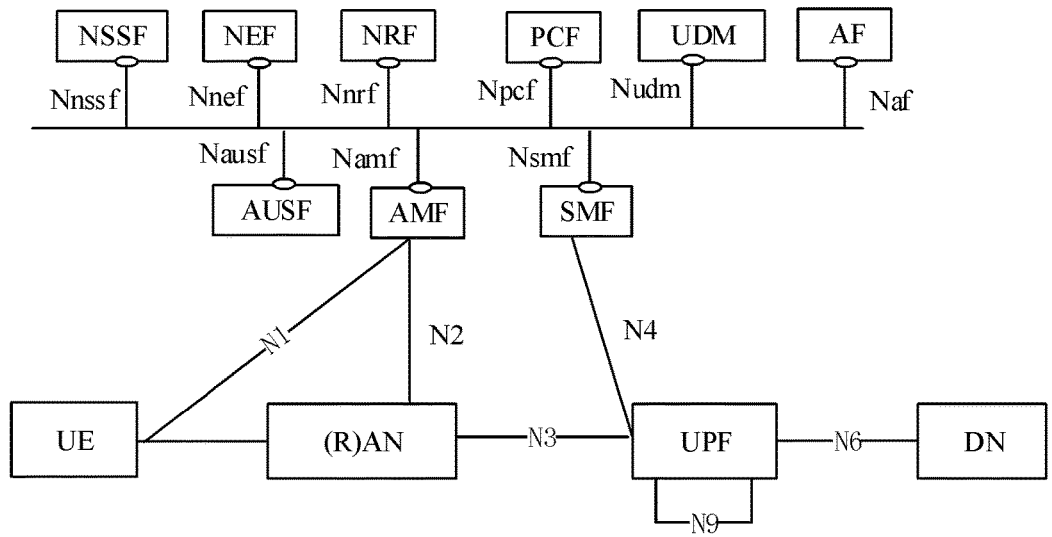
FIG. 1 is a diagram illustrating an exemplary 5G system architecture according to an embodiment of the present disclosure.
FIG. 2 shows a flowchart of a method according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless/wired communication standards such as new radio (NR), long term evolution (LTE), LTE-Advanced, and so on. In the following description, the terms "network" and "system" can be used interchangeably. Furthermore, the communications between two devices in the network may be performed according to any suitable communication protocols, including, but not limited to, the communication protocols as defined by some of standards organizations such as 3GPP, the International Organization for Standardization (ISO), the International Telecommunication Union (ITU), the Institute of Electrical and Electronics Engineers (IEEE), and the Internet Engineering Task Force (IETF), etc. For example, the communication protocols as defined by 3GPP may comprise the fourth generation (4G), 4.5G, 5G communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless/wired communication network. For example, in 5G network, the network function may comprise AUSF, AMF, DN, NEF, NRF, NSSF, PCF, SMF, UDM, UPF, AF, UE, (R)AN, 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the phrase "at least one of A and B" should be understood to mean "only A, only B, or both A and B." The phrase "A and/or B" should be understood to mean "only A, only B, or both A and B."

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture illustrated in FIG. 1. The diagram in FIG. 1 may represent a high level architecture in the next generation network such as 5G. For simplicity, the system architecture of FIG. 1 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, and security. The AUSF, AMF, DN, NEF, NRF, NSSF, PCF, SMF, UDM, UPF, AF, UE, (R)AN may include the functionality for example as defined in 3GPP TS 23.501 V15.4.0. For example, the NEF may act as a gateway which can enable external users to monitor, provision and enforce an application policy for users inside the network. The AUSF may be configured as an authentication server. The UDM can store subscriber data and profiles. The PCF can provide a policy framework incorporating network slicing, roaming and mobility management. The AMF can manage access control and mobility. The SMF can set up and manage sessions according to a network policy. The UPF can be deployed in various configurations and locations according to the service type.

The NRF is a network entity which can provide registration and discovery functionality so that the NFs can discover each other and implement communications via APIs. For example, the "service registration" functionality of the NRF can facilitate the negotiation of how and where a service can be utilized by its consumer such as a NF instance or a service instance. It will be appreciated that a NF instance also may be regarded as a special example of a service instance, and thus the terms "NF instance" and "service instance" may be used interchangeably in some cases.

In accordance with some exemplary embodiments, the NRF can support NF/service discovery functionality. For example, the NRF may receive a NF/service discovery request from a requester NF instance, and provide the information of the discovered NF instance(s) to the requester NF instance. The requester NF instance can implement NF selection. The NF selection may consist in selecting a NF instance among the NF instance(s) discovered through the NF/service discovery. As an example, the SMF selection may be supported by the AMF.

The NRF can maintain NF profiles of available NF instances and their supported services. For example, each NF instance can inform the NRF of a NF profile of this NF instance. The NF profile may comprise a list of services supported by the NF instance, and other NF instance information. The typical information of a NF profile may include but not limit to NF instance ID, NF type (e.g. SMF), PLMN ID, NF protocol information and identification/address information (e.g. URI (Uniform Resource Identifier), URL (Uniform Resource Locator), FQDN or IP address), NF capacity information, NF specific service authorization information, names of supported services, endpoint information of instance(s) of each supported service, the supported data network names (DNNs) or access point names (APNs), NF location, load information at the NF and NF service level, other service parameter, etc.

FIG. 2 shows a flowchart of a method 200 according to an embodiment of the present disclosure, which may be performed by an apparatus implemented in or at a first network function repository node such as the NRF as shown in FIG. 1 or communicatively coupled to the first network function repository node. As such, the first network function repository node may provide means or modules for accomplishing various parts of the method 200 as well as means or modules for accomplishing other processes in conjunction with other components.

At block 202, the first network function repository node may send a first service discovery request including forward information indicating that the first service discovery request has been processed by one or more network function repository nodes to a second network function repository node. The first network function repository node may be triggered to send the first service discovery request due to various reasons. In an embodiment, when the first network function repository node is a NF service consumer, wants to discover the service(s) provided by a NF and can not locate the target NF information in its own region, it may send the first service discovery request to the second network function repository node. In another embodiment, the first network function repository node may send the first service discovery request in response to receiving a second service discovery request. As a first example, when the first network function repository node receives the second service discovery request from a NF service consumer such as AMF or another NRF and decide to forward the second service discovery request for example when it can not locate the target NF information in its own region, it may send the first service discovery request to the second network function repository node. As a second example, when the first network function repository node receives the second service discovery request from a NF service consumer such as AMF or another NRF and the load of the first network function repository node exceeds a predefined threshold level, it may send the first service discovery request to the second network function repository node. The first service discovery request may be generated based on the second service discovery request. For example, the first service discovery request may include a part of information of the second service discovery request, such as query parameters, etc. In addition, the first service discovery request may include any other suitable information such as the forward information.

The first service discovery request may include any suitable information such as query parameters, for example, one or more target NF service name(s) and/or NF type of the target NF and/or NF type of the NF service consumer, etc. In an embodiment, the first service discovery request may be similar to Nnrf_NFDiscovery and Nnrf_NFManagement (such as NFStatusSubscribe) service operation message as defined in 3GPP TS 29.510 V15.2.0 except that it further includes the forward information. For example, NFStatus-Subscribe operation would involve an interaction with NRF to create a subscription so that an NF service consumer can request to be notified when the NF profile(s) of a target NF or a target NF type are changed.

The first network function repository node may obtain the information of one or more second network function repository node in various ways. As a first example, as described in subclause 5.2.2.2.3 of 3GPP TS 29.510 V15.2.0, NRF may register to another NRF. If the NRF receives an NF registration with the nfType set to "NRF", the NRF shall use the information contained in the nfProfile to target the registering NRF when forwarding or redirecting NF service discovery request. As a second example, the information of one or more second network function repository node may be preconfigured in the first network function repository node. As a third example, the first network function repository node may obtain the information of one or more second network function repository node from another network node. After obtaining the information of one or more second network function repository node, the first network function repository node may select one second network function repository node which has not processed the first service discovery request.

In an embodiment, the forward information may include a forward indicator indicating that the first service discovery request has been forwarded before and/or a visited network function repository node list and/or a number of network function repository nodes that have been visited to serve the first service discovery request. The forward indicator may occupy one or more bits. The visited network function repository node list may include an ID of each visited network function repository node. Alternatively the visited network function repository node list may be expressed by a bitmap of network function repository nodes. The number of network function repository nodes may be an integer. As a first example, when the first network function repository node receive a second service discovery request from a network function service consumer such as a third network function repository node and decide to send the first service discovery request which may be generated based on the second service discovery request to the second network function repository node due to various reasons such as unable to fulfill the second service discovery request or load balance or configuration, etc., the visited network function repository node list may include information of the first and third network function repository nodes, and/or the forward indicator may be set as for example "1" which means that the first service discovery request has been forwarded before, and/or the number of network function repository nodes may be set as for example "2" which means that two network function repository nodes have been visited to serve the first service discovery request. As a second example, when the first network function repository node is a NF service consumer, the visited network function repository node list may include information of the first network function repository nodes, and/or the forward indicator may be set as for example "0" which means that the first service discovery request has not been forwarded before, and/or the number of network function repository nodes may be set as for example "1" which means that one network function repository node have been visited to serve the first service discovery request.

In an embodiment, the forward information may further include a maximum number of network function repository nodes that can be visited to serve the first service discovery request. The maximum number be any suitable integer for example depending on a specific communication network or protocol implementation. The maximum number of network function repository nodes may be received from an upstream discovery request or obtained from local configuration.

According to various embodiments, the forward information may be used by the second network function repository node to determine the next hop network function repository node to be queried when the second network function repository node decide to determine the next hop network function repository node due to various reasons for example the target NF profile can't be found locally in the second network function repository node or load balance or configuration.

At block 204, the first network function repository node may receive a first service discovery response from the second network function repository node. The first service discovery response may include any suitable information such as search result. For example, On success, "200 OK" may be returned. The response body may contain a validity period, during which the search result can be cached by the NF service consumer, and an array of NF profile objects, that satisfy the search filter criteria (e.g., all NF instances offering a certain NF Service name). If the NF service consumer is not allowed to discover the NF services for the requested NF type provided in the query parameters, the second network function repository node may return "403 Forbidden" response. If the discovery request fails at the second network function repository node due to errors in the input data in the query parameters, the second network function repository node may return "400 Bad Request" status code with the details of the error. If the discovery request fails at the second network function repository node due to the second network function repository node internal errors, the second network function repository node may return "500 Internal Server Error" status code with the details of the error. The NF profile objects returned in a successful result may contain generic data of each NF instance, applicable to any NF type, and it may also contain NF-specific data, for those NF instances belonging to a specific type.

Figure 3:
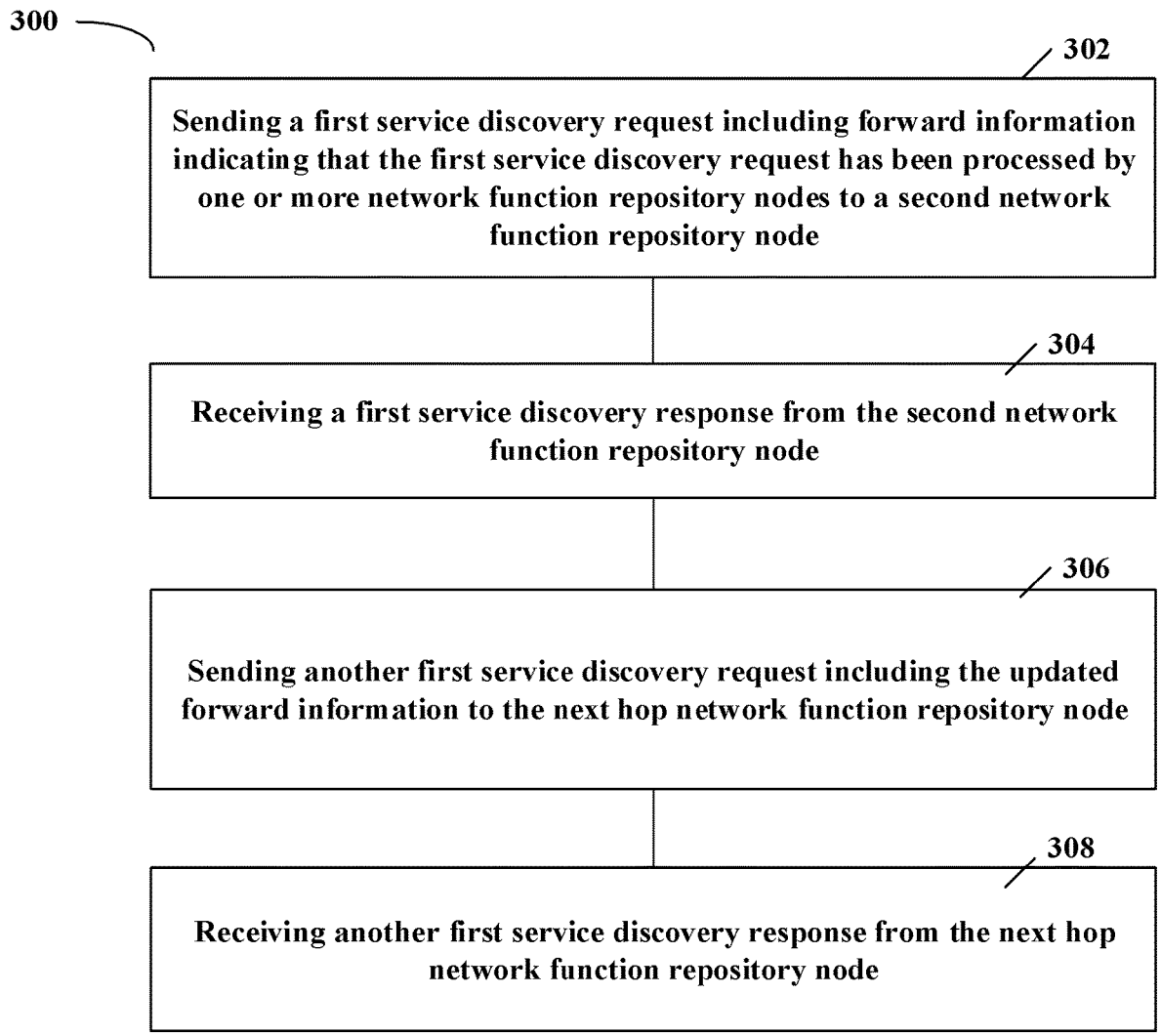
FIG. 3 shows a flowchart of a method according to another embodiment of the present disclosure.

FIG. 3 shows a flowchart of a method 300 according to another embodiment of the present disclosure, which may be performed by an apparatus implemented in or at a first network function repository node such as the NRF as shown in FIG. 1 or communicatively coupled to the first network function repository node. As such, the first network function repository node may provide means or modules for accomplishing various parts of the method 300 as well as means or modules for accomplishing other processes in conjunction with other components. Blocks 302 and 304 are similar to blocks 202 and 204 of FIG. 2, the detailed description of these blocks are omitted here for brevity. In this embodiment, the second network function repository node will make sure that the next hop network function repository node is not in the visited network function repository node list, i.e., the next hop network function repository node has not processed the first service discovery request before.

At block 302, the first network function repository node sends a first service discovery request including forward information indicating that the first service discovery request has been processed by one or more network function repository nodes to a second network function repository node.

At block 304, the first network function repository node receives a first service discovery response from the second network function repository node.

At block 306, the first network function repository node sends another first service discovery request including the updated forward information to the next hop network function repository node.

At block 308, the first network function repository node receives another first service discovery response from the next hop network function repository node.

Blocks 306 and 308 may be performed several times for example until the first service discovery response does not include information of the next hop network function repository node and the updated forward information or the maximum number of network function repository nodes that can be visited to serve the first service discovery request has been reached.

Figure 4:
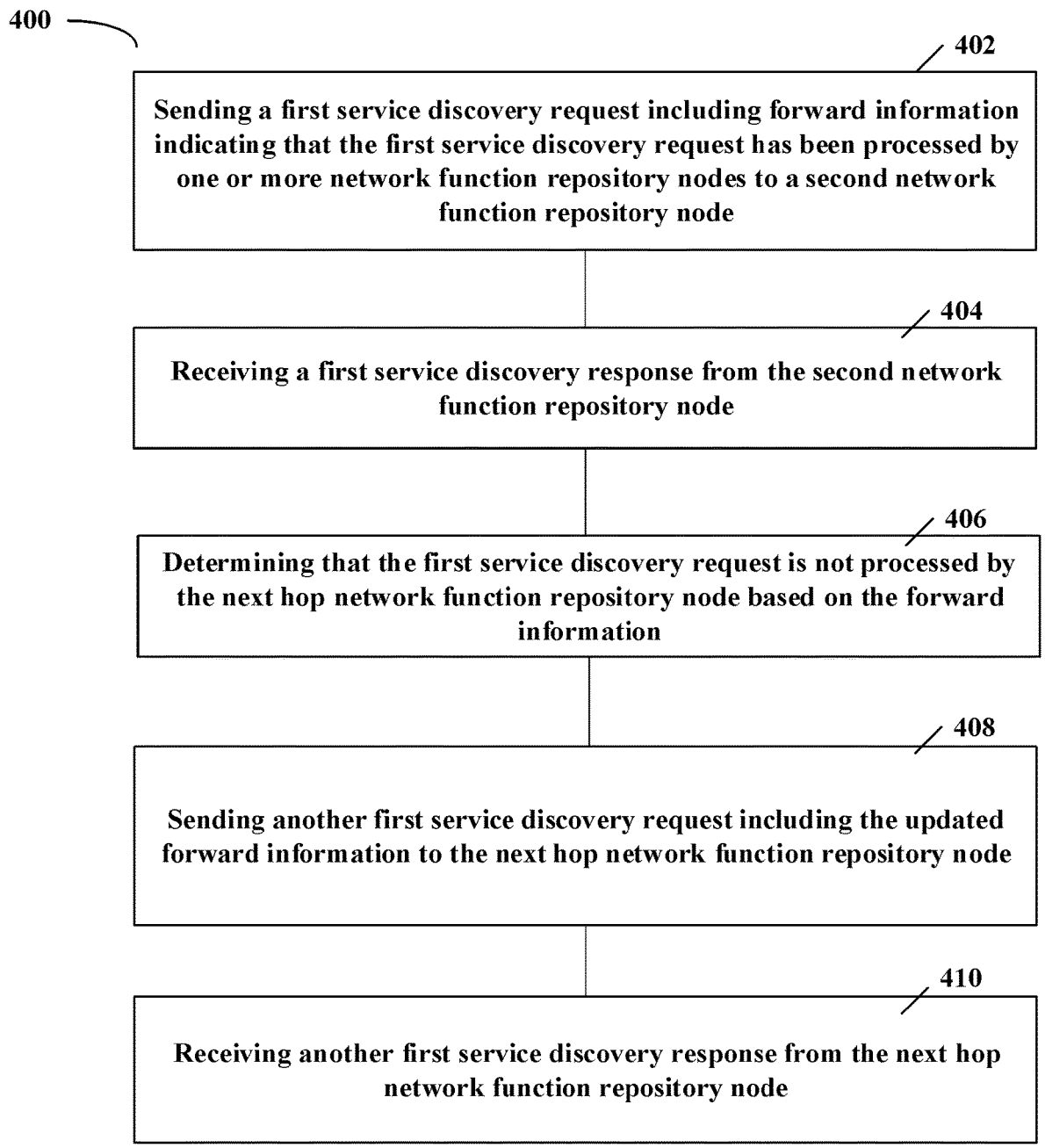
FIG. 4 shows a flowchart of a method according to another embodiment of the present disclosure.

FIG. 4 shows a flowchart of a method 400 according to another embodiment of the present disclosure, which may be performed by an apparatus implemented in or at a first network function repository node such as the NRF as shown in FIG. 1 or communicatively coupled to the first network function repository node. As such, the first network function repository node may provide means or modules for accomplishing various parts of the method 400 as well as means or modules for accomplishing other processes in conjunction with other components. Blocks 402 and 404 are similar to blocks 202 and 204 of FIG. 2, the detailed description of these blocks are omitted here for brevity. In this embodiment, the second network function repository node may be a legacy network function repository node which will not make sure that the next hop network function repository node is not in the visited network function repository node list, i.e., the next hop network function repository node may have processed the first service discovery request before. The second network function repository node may not use the forward information to exclude any network function repository node to be candidate for next hop network function repository node.

At block 402, the first network function repository node sends a first service discovery request including forward information indicating that the first service discovery request has been processed by one or more network function repository nodes to a second network function repository node.

At block 404, the first network function repository node receives a first service discovery response from the second network function repository node.

At block 406, the first network function repository node determines that the first service discovery request is not processed by the next hop network function repository node based on the forward information.

At block 408, the first network function repository node sends another first service discovery request including the updated forward information to the next hop network function repository node.

At block 410, the first network function repository node receives another first service discovery response from the next hop network function repository node.

Blocks 406, 408 and 410 may be performed several times for example until the first service discovery response does not include information of the next hop network function repository node or the maximum number of network function repository nodes has been reached. In addition, when the first network function repository node determines that the first service discovery request has been processed by the next hop network function repository node, blocks 408 and 410 may be omitted. In this case, the first network function repository node may send the first service discovery request including the updated forward information to another network function repository node.

In an embodiment, a network function repository node may be identified with at least one of a network function instance identifier, a network function fully qualified domain name(FQDN), an Internet protocol (IP) address, a universal resource identifier(URI), a uniform resource location(URL), data center information, geography location information, network topology information, network identity information, a sub-network type, subscriber information, network slice information, dedicated core network information, and a designated flag assigned by a network operator.

In an embodiment, the network topology information may comprise at least one of sub-network information, a regional code, a cluster identifier, domain information, host and chassis information, a universally unique identifier (UUID) in cloud deployment, an IP address subnet.

In an embodiment, the network identity information may comprise at least one of mobile country code (MCC) and mobile network code (MNC) and a specific network identifier assigned by a network operator.

In an embodiment, the sub-network type may comprise one evolved packet core (EPC), IP multimedia subsystem (IMS), fifth generation core network(5GC).

In an embodiment, the subscriber information may comprise an international mobile subscriber identity (IMSI) range.

Figure 5:
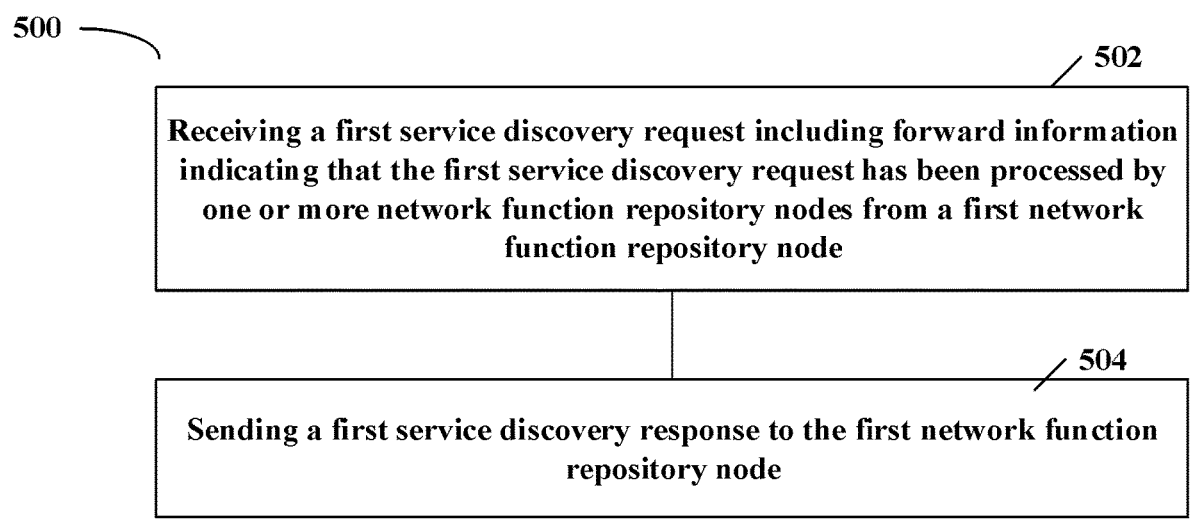
FIG. 5 shows a flowchart of a method according to another embodiment of the present disclosure.

FIG. 5 shows a flowchart of a method 500 according to another embodiment of the present disclosure, which may be performed by an apparatus implemented in or at a second network function repository node such as the NRF as shown in FIG. 1 or communicatively coupled to the second network function repository node. As such, the second network function repository node may provide means or modules for accomplishing various parts of the method 500 as well as means or modules for accomplishing other processes in conjunction with other components. For some parts which have been described in the above embodiments, detailed description thereof is omitted here for brevity.

At block 502, the second network function repository node receives a first service discovery request including forward information indicating that the first service discovery request has been processed by one or more network function repository nodes from a first network function repository node. For example, the first network function repository node may sends the first service discovery request at blocks 202, 302 and 402 of FIGS. 2-4, then the second network function repository node may receive the first service discovery request. The forward information may be used by the second network function repository node to determine a next hop network function repository node that has not been visited to serve the first service discovery request for example when the second network function repository node decides to forward or redirect the first service discovery request to the next hop network function repository node due to various reasons for example unable to fulfill the first service discovery request or load balance or configuration, etc.

In an embodiment, the forward information may include a forward indicator indicating that the first service discovery request has been forwarded before and/or a visited network function repository node list and/or a number of network function repository nodes that have been visited to serve the first service discovery request. The second network function repository node may check the forward indicator to decide whether to determine the next hop network function repository node. For example, when the first service discovery request has been forwarded before, the second network function repository node may not determine the next hop network function repository node. Otherwise the first service discovery request may determine the next hop network function repository node. The visited network function repository node list may be used by the second network function repository node to make sure that the next hop network function repository node is not in the visited network function repository node list. The number of network function repository nodes may be used by the second network function repository node to make sure that the number of visited network function repository nodes does not exceed the maximum number of network function repository nodes that can be visited to serve the first service discovery request. The maximum number of network function repository nodes may be received from the first service discovery request or obtained locally in the second network function repository node or obtained from another network device. In an embodiment, the forward information further includes the maximum number of network function repository nodes that can be visited to serve the first service discovery request.

In an embodiment, the visited network function repository node list includes information of the first network function repository node.

At block 504, the second network function repository node sends a first service discovery response to the first network function repository node. The first service discovery response may include search result as described above.

Figure 6:
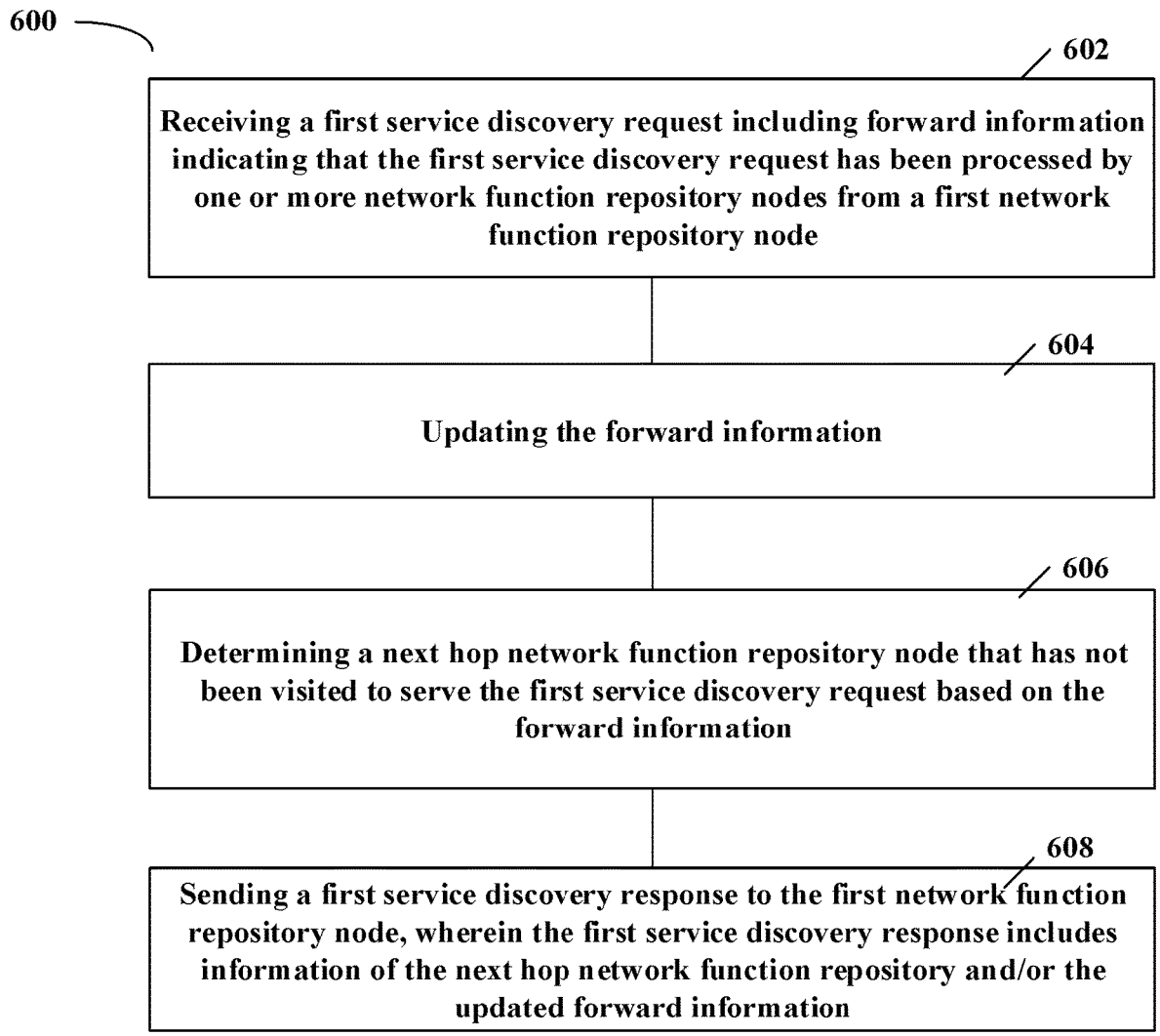
FIG. 6 shows a flowchart of a method according to another embodiment of the present disclosure.

FIG. 6 shows a flowchart of a method 600 according to another embodiment of the present disclosure, which may be performed by an apparatus implemented in or at a second network function repository node such as the NRF as shown in FIG. 1 or communicatively coupled to the second network function repository node. As such, the second network function repository node may provide means or modules for accomplishing various parts of the method 600 as well as means or modules for accomplishing other processes in conjunction with other components. For some parts which have been described in the above embodiments, detailed description thereof is omitted here for brevity. In this embodiment, the second network function repository node decides to redirect the first service discovery request to a next hop network function repository node for example due to various reasons such as unable to fulfill the second service discovery request or load balance or configuration, etc.

At block 602, the second network function repository node receives a first service discovery request including forward information indicating that the first service discovery request has been processed by one or more network function repository nodes from a first network function repository node.

At block 604, the second network function repository node updates the forward information. For example, when the forward information includes the forward indicator and/or the visited network function repository node list and/or the number of network function repository nodes, the second network function repository node may set/update the forward indicator; include the information of the second network function repository node in the visited network function repository node list; increment the number of network function repository nodes.

At block 606, the second network function repository node determines a next hop network function repository node that has not been visited to serve the first service discovery request based on the forward information. For example, the second network function repository node may exclude any network function repository node in the visited network function repository node list to be candidate for the next hop network function repository node.

At block 608, the second network function repository node sends a first service discovery response to the first network function repository node. The first service discovery response may include information of the next hop network function repository and/or the updated forward information.

Figure 7:
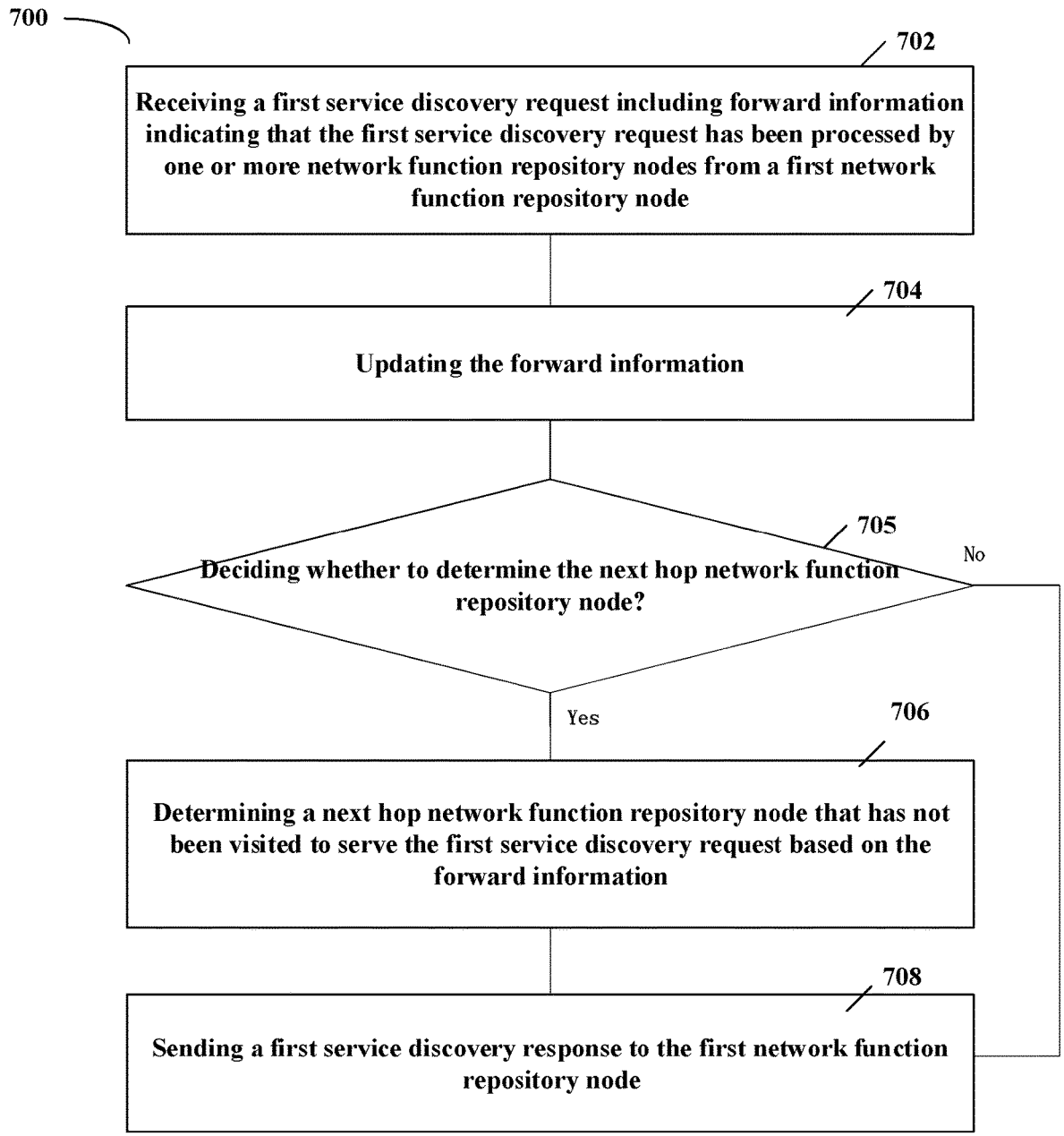
FIG. 7 shows a flowchart of a method according to another embodiment of the present disclosure.

FIG. 7 shows a flowchart of a method 700 according to another embodiment of the present disclosure, which may be performed by an apparatus implemented in or at a second network function repository node such as the NRF as shown in FIG. 1 or communicatively coupled to the second network function repository node. Blocks 702, 704, 706 and 708 are similar to blocks 602, 604, 606 and 608 of FIG. 6, the detailed description of these blocks are omitted here for brevity.

At block 705, when the forward information includes a number of network function repository nodes that have been visited to serve the first service discovery request, the second network function repository node decides whether to determine the next hop network function repository node that has not been visited to serve the first service discovery request based on an updated number of network function repository nodes and a maximum number of network function repository nodes that can be visited to serve the first service discovery request. For example, the second network function repository node may increment the number of network function repository nodes and when the updated number of network function repository nodes does not exceed the maximum number of network function repository nodes, the second network function repository node may determine the next hop network function repository node. Otherwise the second network function repository node may not determine the next hop network function repository node. The maximum number of network function repository nodes be received from the first service discovery request or obtained from local configuration.

Figure 8:
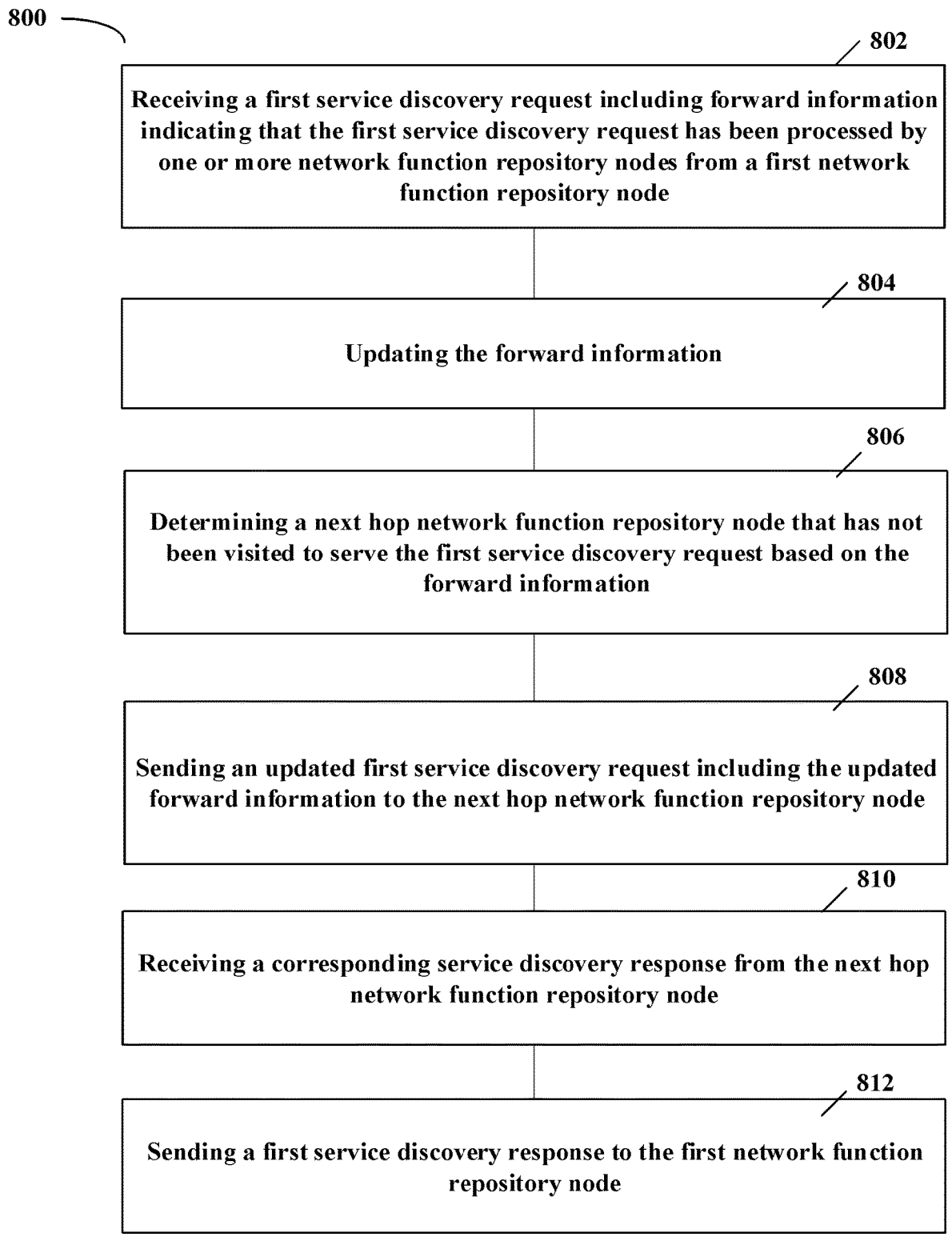
FIG. 8 shows a flowchart of a method according to another embodiment of the present disclosure.

FIG. 8 shows a flowchart of a method 800 according to another embodiment of the present disclosure, which may be performed by an apparatus implemented in or at a second network function repository node such as the NRF as shown in FIG. 1 or communicatively coupled to the second network function repository node. As such, the second network function repository node may provide means or modules for accomplishing various parts of the method 800 as well as means or modules for accomplishing other processes in conjunction with other components. For some parts which have been described in the above embodiments, detailed description thereof is omitted here for brevity. In this embodiment, the second network function repository node decides to forward the first service discovery request to a next hop network function repository node for example due to various reasons such as unable to fulfill the second service discovery request or load balance or configuration, etc.

At block 802, the second network function repository node receives a first service discovery request including forward information indicating that the first service discovery request has been processed by one or more network function repository nodes from a first network function repository node.

At block 804, the second network function repository node updates the forward information. For example, when the forward information includes the forward indicator and/or the visited network function repository node list and/or the number of network function repository nodes, the second network function repository node may set the forward indicator when the forward indicator has not been set; include the information of the second network function repository node in the visited network function repository node list; increment the number of network function repository nodes.

At block 806, the second network function repository node determines a next hop network function repository node that has not been visited to serve the first service discovery request;

At block 808, the second network function repository node sends an updated first service discovery request including the updated forward information to the next hop network function repository node.

At block 810, the second network function repository node receives a corresponding service discovery response from the next hop network function repository node.

Blocks 808 and 810 may be performed several times for example until the first service discovery response does not include information of the next hop network function repository node or the maximum number of network function repository nodes has been reached.

At block 812, the second network function repository node sends a first service discovery response to the first network function repository node.

Figure 9:
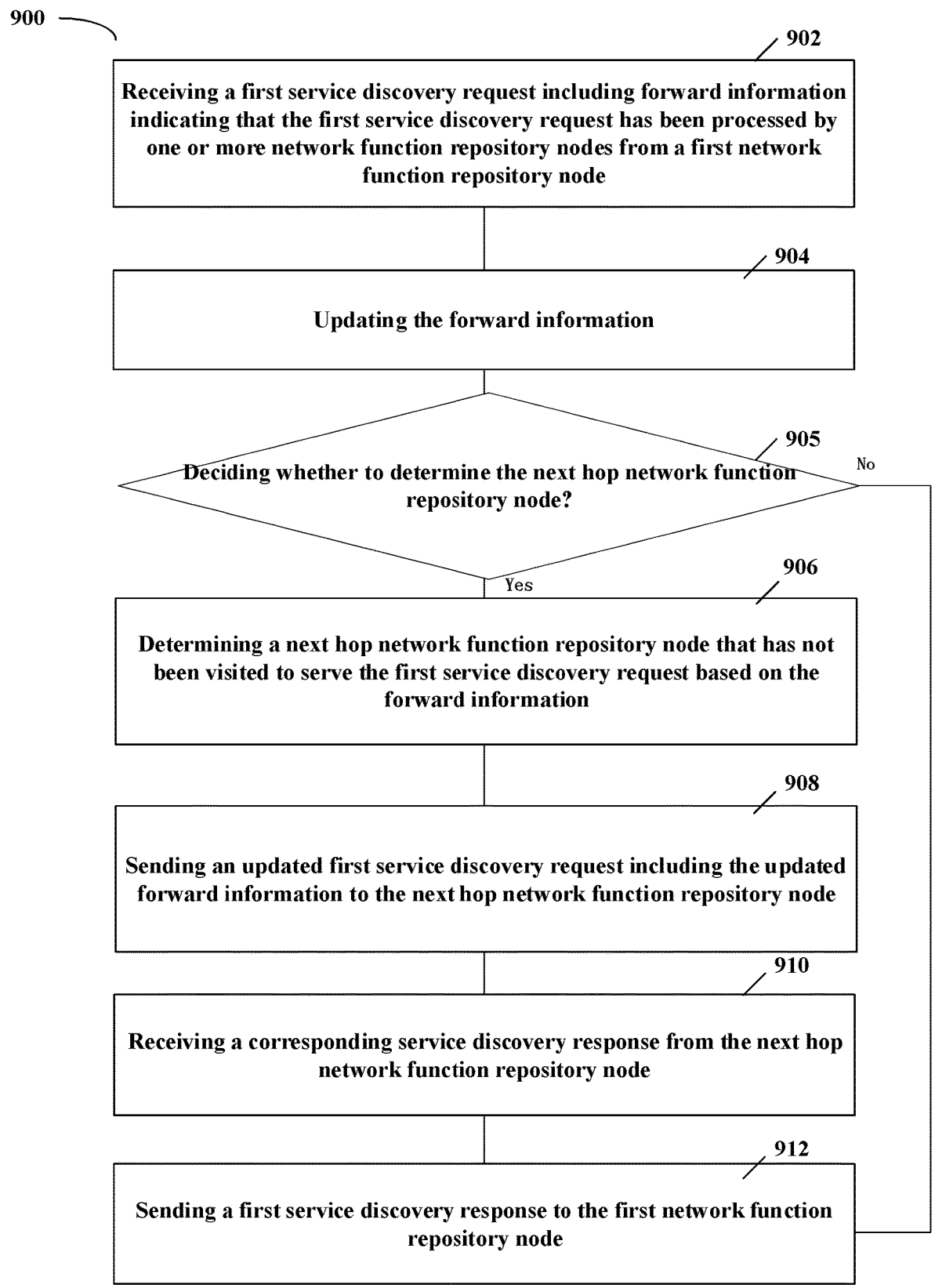
FIG. 9 shows a flowchart of a method according to another embodiment of the present disclosure.

FIG. 9 shows a flowchart of a method 900 according to another embodiment of the present disclosure, which may be performed by an apparatus implemented in or at a second network function repository node such as the NRF as shown in FIG. 1 or communicatively coupled to the second network function repository node. Blocks 902, 904, 906, 908, 910 and 912 are similar to blocks 802, 804, 806, 808, 810 and 812 of FIG. 8, the detailed description of these blocks are omitted here for brevity.

At block 905, when the forward information includes a number of network function repository nodes that have been visited to serve the first service discovery request, the second network function repository node decides whether to determine the next hop network function repository node that has not been visited to serve the first service discovery request based on an updated number of network function repository nodes and a maximum number of network function repository nodes that can be visited to serve the first service discovery request. For example, the second network function repository node may increment the number of network function repository nodes and when the updated number of network function repository nodes does not exceed the maximum number of network function repository nodes, the second network function repository node may determine the next hop network function repository node. Otherwise the second network function repository node may not determine the next hop network function repository node. The maximum number of network function repository nodes be received from the first service discovery request or obtained from local configuration.

Many advantages may be achieved by applying the proposed solution according to embodiments of the present disclosure. For example, some embodiments of the present disclosure may enable 5G core network (5GC) NF to do service discovery cross region and prevent a potential service request loop. Some embodiments of the present disclosure may avoid a service request being forwarded or redirected among intermediate NRFs too many times. Some embodiments of the present disclosure can make sure that a potential discovery request loop is detected properly by the network function repository node.

The various blocks shown in FIG. 2-9 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 10A:
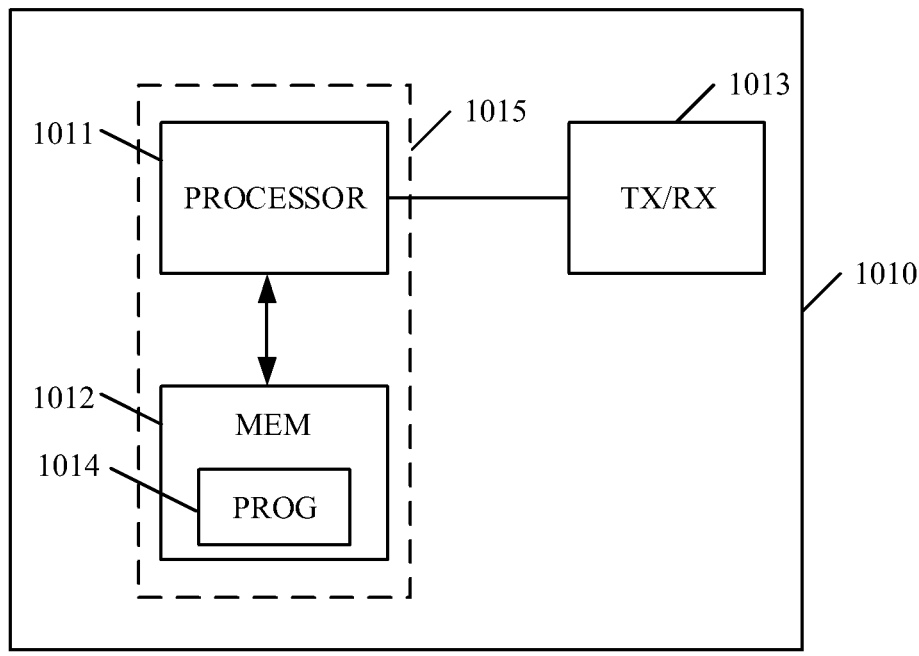
FIG. 10a illustrates simplified block diagrams of an apparatus according to an embodiment of the present disclosure.
Figure 10B:
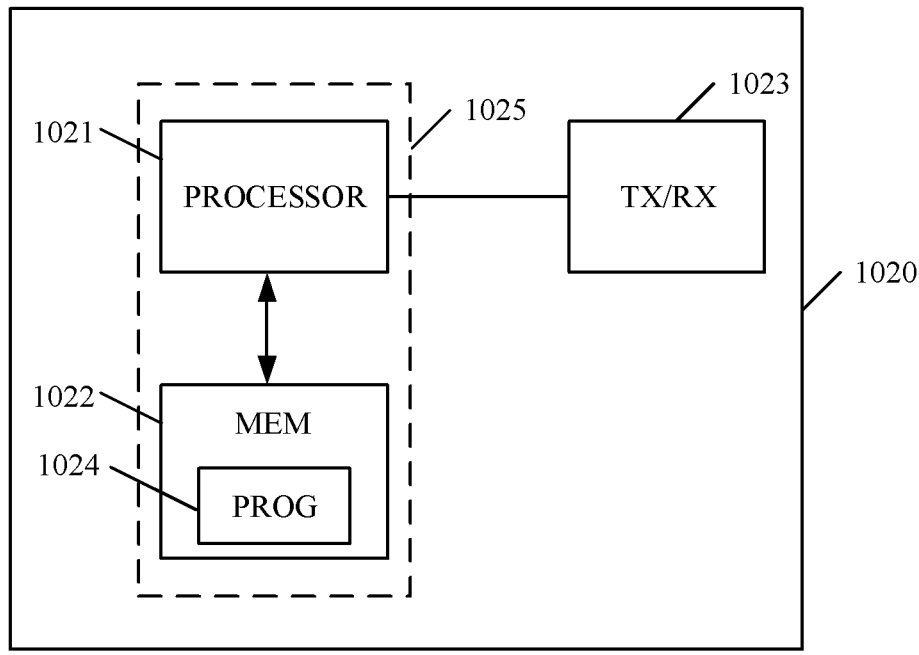
FIG. 10b illustrates simplified block diagrams of an apparatus according to another embodiment of the present disclosure.

FIG. 10a illustrates a simplified block diagram of an apparatus 1010 that may be embodied in/as a first network function repository node according to an embodiment of the present disclosure. FIG. 10b illustrates an apparatus 1020 that may be embodied in/as a second network function repository node according to an embodiment of the present disclosure.

The apparatus 1010 may comprise at least one processor 1011, such as a data processor (DP) and at least one memory (MEM) 1012 coupled to the processor 1011. The apparatus 1010 may further comprise a transmitter TX and receiver RX 1013 coupled to the processor 1011. The MEM 1012 stores a program (PROG) 1014. The PROG 1014 may include instructions that, when executed on the associated processor 1011, enable the apparatus 1010 to operate in accordance with the embodiments of the present disclosure, for example to perform any of the methods related to the first network function repository node as described above. A combination of the at least one processor 1011 and the at least one MEM 1012 may form processing means 1015 adapted to implement various embodiments of the present disclosure.

The apparatus 1020 comprises at least one processor 1021, such as a DP, and at least one MEM 1022 coupled to the processor 1021. The apparatus 1020 may further comprise a transmitter TX and receiver RX 1023 coupled to the processor 1021. The MEM 1022 stores a PROG 1024. The PROG 1024 may include instructions that, when executed on the associated processor 1021, enable the apparatus 1020 to operate in accordance with the embodiments of the present disclosure, for example to perform any of the methods related to the second network function repository node as described above. A combination of the at least one processor 1021 and the at least one MEM 1022 may form processing means 1025 adapted to implement various embodiments of the present disclosure.

Various embodiments of the present disclosure may be implemented by computer program executable by one or more of the processors 1011 and 1021, software, firmware, hardware or in a combination thereof.

The MEMs 1012 and 1022 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 1011 and 1021 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the first network function repository node as described above.

According to an aspect of the disclosure it is provided a computer program product being tangibly stored on a computer readable storage medium and including instructions which, when executed on at least one processor, cause the at least one processor to carry out any of the methods related to the second network function repository node as described above.

According to an aspect of the disclosure it is provided a computer-readable storage medium storing instructions which when executed by at least one processor, cause the at least one processor to carry out any of the methods related to the first network function repository node as described above.

According to an aspect of the disclosure it is provided a computer-readable storage medium storing instructions which when executed by at least one processor, cause the at least one processor to carry out any of the methods related to the second network function repository node as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a first network function repository node, comprising:
sending a first service discovery request including forward information indicating that the first service discovery request has been processed by one or more network function repository nodes to a second network function repository node, the forward information including a forward indicator indicating that the first service discovery request has been forwarded before and/or a visited network function repository node list and/or a number of network function repository nodes that have been visited to serve the first service discovery request; and
receiving a first service discovery response from the second network function repository node.

2. The method according to claim 1, wherein the forward information further includes a maximum number of network function repository nodes that can be visited to serve the first service discovery request.

3. The method according to claim 1, wherein the visited network function repository node list includes information of the first network function repository node.

4. The method according to claim 1, wherein sending the first service discovery request is in response to the first network function repository node receives a second service discovery request.

5. The method according to claim 4, wherein the first service discovery request is generated based on the second service discovery request.

6. The method according to claim 1, wherein the first service discovery response includes information of a next hop network function repository node and updated forward information, the method further comprises:
sending another first service discovery request including the updated forward information to the next hop network function repository node; and
receiving another first service discovery response from the next hop network function repository node.

7. The method according to claim 1, wherein the first service discovery response includes information of a next hop network function repository node, the method further comprises:
determining that the first service discovery request is not processed by the next hop network function repository node based on the forward information;
sending another first service discovery request including updated forward information to the next hop network function repository node; and
receiving another first service discovery response from the next hop network function repository node.

8. The method according to claim 1, wherein a network function repository node is identified with at least one of:
a network function instance identifier,
a network function fully qualified domain name (FQDN),
an Internet protocol (IP) address,
a universal resource identifier (URI),
a uniform resource location (URL),
data center information,
geography location information,
network topology information,
network identity information,
a sub-network type,
subscriber information,
network slice information,
dedicated core network information, and
a designated flag assigned by a network operator.

9. A method at a second network function repository node, comprising:
receiving a first service discovery request including forward information indicating that the first service discovery request has been processed by one or more network function repository nodes from a first network function repository node, the forward information including a forward indicator indicating that the first service discovery request has been forwarded before and/or a visited network function repository node list and/or a number of network function repository nodes that have been visited to serve the first service discovery request; and
sending a first service discovery response to the first network function repository node.

10. The method according to claim 9, wherein the forward information further includes a maximum number of network function repository nodes that can be visited to serve the first service discovery request.

11. The method according to claim 9, wherein the visited network function repository node list includes information of the first network function repository node.

12. The method according to claim 9, further comprising:
updating the forward information;
determining a next hop network function repository node that has not been visited to serve the first service discovery request based on the forward information,
wherein the first service discovery response includes information of the next hop network function repository and/or the updated forward information.

13. The method according to claim 12, wherein the forward information includes a number of network function repository nodes that have been visited to serve the first service discovery request, the method further comprises:
deciding whether to determine the next hop network function repository node that has not been visited to serve the first service discovery request based on an updated number of network function repository nodes and a maximum number of network function repository nodes that can be visited to serve the first service discovery request.

14. The method according to claim 9, further comprising:
updating the forward information;
determining a next hop network function repository node that has not been visited to serve the first service discovery request;
sending an updated first service discovery request including the updated forward information to the next hop network function repository node; and
receiving a corresponding service discovery response from the next hop network function repository node.

15. The method according to claim 14, wherein the forward information includes a number of network function repository nodes that have been visited to serve the first service discovery request and a maximum number of network function repository nodes that can be visited to serve the first service discovery request, the method further comprises:
deciding whether to determine the next hop network function repository node that has not been visited to serve the first service discovery request based on the updated number of network function repository nodes and the maximum number of network function repository nodes.

16. The method according to claim 9, wherein a network function repository node is identified with at least one of
a network function instance identifier,
a network function fully qualified domain name (FQDN),
an Internet protocol (IP) address,
a universal resource identifier (URI),
a uniform resource location (URL),
data center information,
geography location information,
network topology information,
network identity information,
a sub-network type,
subscriber information,
network slice information,
dedicated core network information, and
a designated flag assigned by a network operator.

17. An apparatus at a first network function repository node, comprising:

a processor; and
a memory coupled to the processor, said memory containing instructions executable by said processor, whereby said apparatus is operative to:
send a first service discovery request including forward information indicating that the first service discovery request has been processed by one or more network function repository nodes to a second network function repository node, the forward information including a forward indicator indicating that the first service discovery request has been forwarded before and/or a visited network function repository node list and/or a number of network function repository nodes that have been visited to serve the first service discovery request; and
receive a first service discovery response from the second network function repository node.

18. The apparatus according to claim 17, wherein the first service discovery response includes information of a next hop network function repository node and updated forward information and wherein the apparatus is further operative to:
send another first service discovery request including the updated forward information to the next hop network function repository node; and
receive another first service discovery response from the next hop network function repository node.

\* \* \* \* \*